April 28, 1925.
F. D. WILSON
BUNDLE CARRIER
Original Filed Sept. 7, 1915    2 Sheets-Sheet 1
1,535,442
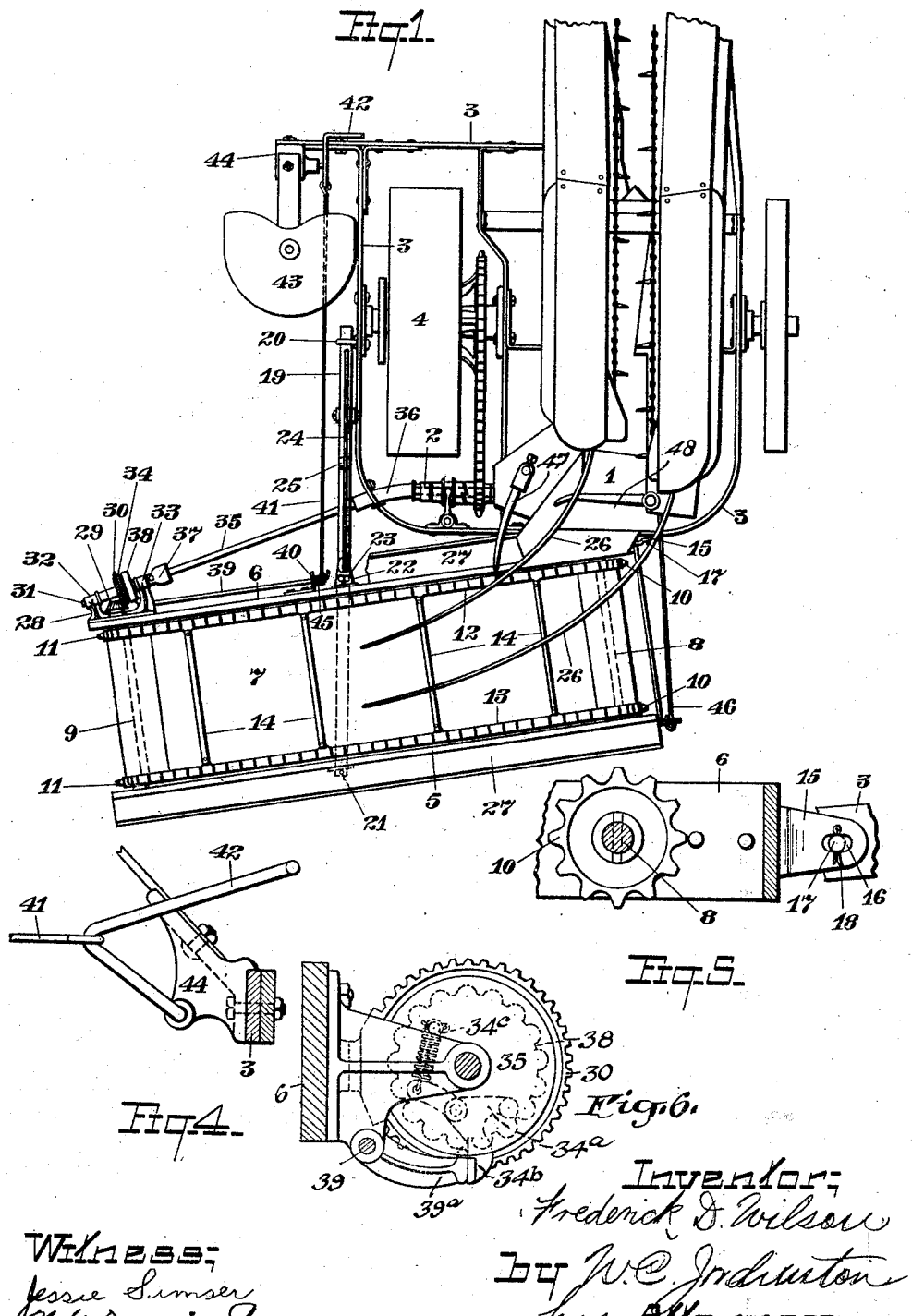

April 28, 1925.
F. D. WILSON
BUNDLE CARRIER
1,535,442
Original Filed Sept. 7, 1915   2 Sheets-Sheet 2
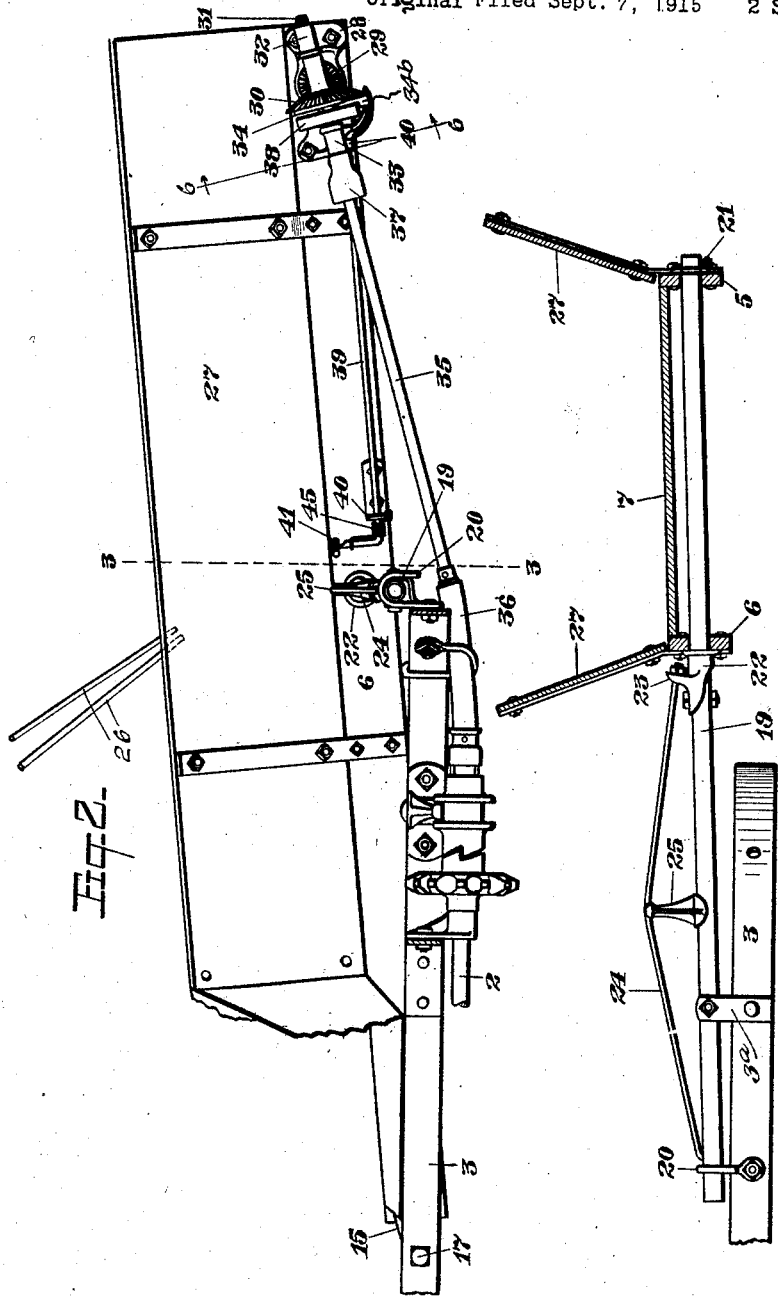

Patented Apr. 28, 1925.

1,535,442

UNITED STATES PATENT OFFICE.

FREDERICK D. WILSON, OF MOLINE, ILLINOIS, ASSIGNOR TO DEERE AND COMPANY, OF MOLINE, ILLINOIS, A CORPORATION OF ILLINOIS.

BUNDLE CARRIER.

Application filed September 7, 1915, Serial No. 49,347. Renewed February 28, 1922. Serial No. 539,907.

*To all whom it may concern:*

Be it known that I, FREDERICK D. WILSON, a citizen of the United States, residing at Moline, in the county of Rock Island and State of Illinois, have invented certain new and useful Improvements in Bundle Carriers, of which the following is a specification, reference being had therein to the accompanying drawing.

My invention relates to that class of devices known as bundle carriers, adapted for attachment to a grain harvester to receive bundles of grain and deposit them upon the ground singly or collectively as may be desired.

The object of my invention is to provide a carrier more particularly applicable to a corn harvester, and which is quickly and effectively operative to receive bundles from the harvester and deposit them upon the ground in such a manner that the bundles will be entirely out of the way of the horses or machine harvesting the next row.

Referring to the drawings in which similar numerals indicate identical parts—

Figure 1 is a plan view of the rear end of a corn harvester showing my invention attached.

Figure 2 is a front elevation of the carrier showing the operating connections.

Figure 3 is a section in detail on the line 3—3 of Figure 2 and Figure 6 is an enlarged detail, being a partial cross section on line 6—6 of Figure 2.

Figure 4 is an enlarged detail of part of the clutch operating mechanism.

Figure 5 is an enlarged sectional detail of the forward lower end of the carrier.

I have shown in the drawings sufficient of a corn harvester to illustrate the application of my invention thereto, the harvester being of that well known type by which the corn is cut and conveyed in a substantially vertical position to the rear of the machine where it is bound and deposited prone upon the ground or upon a receiver which deposits the bundles to one side of the machine.

Receivers or bundle carriers of many forms have been designed and employed upon harvesters of this class being adapted to receive one or more bundles and to be swung stubbleward and rocked to deposit the load upon the ground; I have found however that carriers of the type alluded to are not capable of depositing the bundles a sufficient distance from the harvester to fully avoid the horses on the next round of the machine. Having this and other defects in view I have invented and herein describe a carrier which is at all times in position to receive one or more bundles and which is operatively at will to carry them to one side of the machine and deposit them upon the ground a sufficient distance from the harvester to prevent interference with the horses on subsequent passage of the machine.

The corn after being cut is conveyed rearwardly to a substantially vertical binder located to receive the stalks as they accumulate from a passage way 1 between conveyor mechanism common to this type of harvester; a drive shaft 2 is journaled in suitable bearings on a main frame 3 and is rotated by a chain connection with a bull wheel 4. My bundle carrier comprises a frame having side bars 5 and 6 between and to which is rigidly secured a table 7 shorter than the side bars 5 and 6. A shaft 8 at the receiving end of the carrier is journaled in bearings on the side bars 5 and 6, and a similar shaft 9 is similarly mounted at the delivery end of the carrier; idler sprocket wheels 10 are secured on the shaft 8 and similar sprocket wheels 11 are rigidly secured on the shaft 9; endless chains 12 and 13 travel over the sprocket wheels 10 and 11 and above and below the table 7 and preferably close to the side bars 5 and 6.

Spaced apart a desired distance and secured at their ends to the chains 12 and 13 are bars or slats 14, which with the chains 12 and 13 form a conveyor by operation of which the bundles are ejected from the delivery end of the carrier. The carrier is flexibly supported on the frame 3 in the following manner; rigidly secured on the grainward end of the side bar 6 is a bent iron or bracket 15 having a longitudinal slot 16 through which projects a bolt or stud 17 secured on the rear of the frame 3 and held in the slot 16 by a pin or cotter 18. Pivotally supported intermediate its length by an upright 3ᵃ at the side of the frame 3 is a bar 19, substantially parallel with the line of draft, and having its forward end adapted to engage with a stop 20, preferably a hook secured to the frame 3 as best shown in Figures 2 and 3; the bar 19 projects rearwardly beyond its pivot and supports the carrier, passing through suitable openings in the side bars 5 and 6 and is prevented from withdrawal therefrom by a cotter 21. Rigidly secured on the bar 19 is a member 22 against which the carrier contacts; the member 22 has an upstanding arm 23 to which one end of a truss rod 24 is secured, said rod 24 extending over a vertical arm or strut 25 rigidly mounted on the bar 19 adjacent the pivot thereof and connected to said bar preferably by having its forward end formed into a hook to engage with a perforation in the bar 19.

As shown in the drawings the carrier extends stubbleward and rearward at an angle to the rear of the frame 3, substantially at the angle assumed by the bundles as they are ejected from the harvester and guided by guide rods 26 common in machines of this class. Secured to the side bars 5 and 6 are upwardly and outwardly inclined sides 27 which form, with the table 7 a receptacle to confine the bundles while they are being moved to be deposited on the ground. Secured on the side bar 6 adjacent its stubbleward end is a casting 28 having a bearing thereon for the forward end of the shaft 9; a bevel pinion 29 is rigidly mounted on the forward end of the shaft 9 and meshes with a bevel gear 30 loosely mounted on a shaft 31, the latter being supported in bearings 32 and 33 preferably integral with the casting 28.

On the rear of the bevel gear 30, and preferably integral therewith is a member 34 of a two part clutch of any preferred form which carries a dog $34^a$. Power to operate the carrier is transmitted from the drive shaft 2 to the shaft 31 through an intermediate shaft 35 which is connected to the shafts 2 and 31 by universal couplings 36 and 37 which may be of any preferred form and which are commonly employed when two or more shafts are connected together at an angle to each other and adapted to transmit power from one to the other.

Rigidly mounted on the shaft 31 is the second member 38 of the clutch which is adapted to be operatively connected with the clutch member 34 through the dog $34^a$ by the operation of a rod 39 rockable in bearings 40 on the side bar 6 and having a trip arm $39^a$ which normally lies in the path of a lug $34^b$ carried by the dog $34^a$. When the parts are in the position shown in Figure 6, the trip arm $39^a$ is in engagement with the lug $34^b$ and then holds the dog $34^a$ out of operative engagement with the clutch member 38 which is constantly driven by power derived from the ground wheel 4. By rocking the shaft 39 to move the trip arm $39^a$ out of engagement with the lug $34^b$, the dog $34^a$ will be permitted to move into engagement with the clutch member 38 under the action of a coil spring $34^c$ shown in Figure 6. When this occurs the clutch member 34, which is normally stationary, will be operatively connected with the constantly rotating clutch member 38, so that it rotates with it, thereby causing the shaft 9 to rotate and advance the conveyor. The grainward end of the rod 39 is bent upward and connected to a rod 41 which extends forward and is attached to a bell crank foot lever 42 pivotally supported on the frame 3 adjacent the driver's seat 43, the latter being mounted on a support 44 secured on the frame 3. The trip arm $39^a$ is normally held in the position shown in Figure 6 so that the two parts of the clutch are held normally out of engagement, by a coil spring 45 on the rod 39 which operates on the rod 39 between the upwardly bent end and the bearing 40.

To further support the carrier I use a rod 46 which is attached to the binder frame and is connected to the side bar 5 in any suitable way, as by providing it with a loop or eye hooked to a bar secured to said side bar, as shown in Fig. 1.

The binding apparatus, proper, is of any well known sort. The stalks that are carried through the passageway 1 are held on the supporting table or floor 48 while being bound. Each bundle, after it is tied, is ejected in the usual manner, its lower or butt end being caused to move bodily from the support or floor 48 to the inner end of the carrier, which prevents it from falling to the ground, it being at the same time forced along the curved guideway between the rods 26. The rotary arm 47 engages with the top part of each bundle and gives it a pushing impulse which causes the upper end to fall toward the stubble side. As it falls its downward movement is retarded somewhat by the guides 26, 26, which are shaped and positioned so as to converge and to gradually narrow the space between them. These guides are resilient rods which are bent around from the binder toward the stubble side, and their free ends are carried downward. The passage between their end parts is approximately parallel to the longitudinal lines of the carrier. While a bundle is falling its thinner upper part comes into engagement with the converging parts of the guide rods and the latter maintain a slight pressure upon them as they fall. As before stated power to operate the carrier is derived from the bull wheel 4 and transmitted to the carrier through the drive shaft 2 and the shafts 31 and 35, which rotate continuously.

When the desired number of bundles has accumulated in the carrier the driver of the harvester rocks the bell crank lever 42 and the rod 39 simultaneously through the connecting rod 41 so that the clutch members 34 and 38 are brought together and the operative power is transmitted to the bevel gear 30 is mesh with the bevel pinion 29; the bevel pinion 29 is rigidly mounted on the shaft 9 consequently the latter and the sprocket wheel 11 thereon are rotated by power received through the bevel gear 30 so that the endless chains 12 and 13 are drawn toward the delivery end of the carrier, and as the bars or slats 14 are connected to the chains 12 and 13, across the table 7 and close thereto, the bundles in the carrier and resting upon the bars or slats 14 are moved toward the delivery end thereof and are finally deposited upon the ground; when this operation is completed, the lever 42 is released and the clutch members 34 and 38 separate by action of the spring 45 so that the chains 12 and 13 and the bars 14 remain stationary until it is desired to again operate them to deposit more bundles upon the ground.

By driving the conveyor at the delivery end of the carrier the power is applied to drag the bundles rather than to push them as would be the case if the power was applied to the shaft 8, consequently the chain is always taut above the table 7 and there is no lost motion in conveying the bundles to the delivery end of the carrier and depositing them upon the ground.

Ordinarily in carriers of this class as the bundles are conveyed stubbleward by the carrier the tops come in contact with the ground first and, with the advance of the machine the bundles are deposited upon the ground by the action of the conveyers of the carrier, at an angle to the line of draft of the harvester; I have found however that it is desirable that the bundles be removed as far as possible from the machine, and this I accomplish by making the rear side 27 of the carrier of sufficient height so that, when the heads of the bundles are on the ground and their contact therewith is aiding the carrier to eject the bundles entirely, the advance of the machine will cause the rear side 27 of the carrier to force the rear ends of the bundles forward as they are moved stubbleward, this action resulting in the bundles being deposited upon the ground practically parallel with the line of draft and entirely removed out of the way of the horses on succeeding trips, the angular position of the carrier relative to the transverse vertical plane of the harvester aiding materially in this action.

The carrier is supported on the bar 19 and is also pivotally connected to the frame 3 by the bolt or stud 17 and the iron or bracket 15, and as the bar 19 is pivotally supported on the frame 3, intermediate the carrier and the forward end of the bar 19, and is rockable on its pivot so that the rear end, on which the carrier is supported, can be raised, and as the rod 46 is loosely connected with the side bar 5 it follows that damage to the carrier by contact with the ground is unlikely to occur when the wheels or bull wheel of the harvester rolls into a depression; this avoidance of injury to the carrier is only possible by a flexible connection with the harvester such as I have shown and described, it being obvious that the stop 20 prevents the bar 19 and the carrier from dropping below its fixed position relative to the frame and the ground.

With an apparatus having its parts constructed, positioned and related as those herein, the bundles fall sidewise from the binder as they successively leave the support which holds the stalks in vertical position while they are being bound. The butt end of each bundle, as it leaves the supporting plate of the binder, moves to, and rests upon the inner end of the carrier, and the ejecting arm engaging with the top part of the bundle gives it a push as aforesaid toward the stubble.

The guide rods complete the turning movement of the bundle and deliver it to the carrier which is positioned on laterally directed lines and receives them as they fall laterally, they finally resting upon it on lines longitudinal thereof.

Such a carrier is in contrast with those that have been heretofore proposed, each of which include an endless conveyer immediately behind the binding mechanism and mounted to travel across and at right angles to the path of the machine. In a machine of that sort the bundles fall in vertical longitudinal planes directly rearward onto the conveyer and rest thereon on lines transverse to the path of the conveyer, and not on lines longitudinal thereof, as they do in the present mechanism.

The earlier carriers each required a supporting apron or belt as wide as the longest bundles, and had to be long enough to extend far enough laterally, to convey the bundles to positions entirely outside of the paths of the horses followed by them when traveling on the next round. And such a mechanism must be heavy, cumbersome and expensive.

When the present mechanism is in operation the bundles, instead of falling through paths in the vertical longitudinal planes of the machine, are turned around, and by the time they drop to their prone position, longitudinal of the carrier, they have their tops turned toward points outside of the bull wheel at which points they are to be deposited. This can be accomplished with a small, light support and conveyer.

I found it advantageous to so arrange this support and conveyer that they are positioned at an angle to the path of the machine, and so related to the binding devices and the adjacent support, that I can rapidly transfer the bundles, successively, from an upright to a laterally prostrate position, and then while they are moving endwise, deliver them to the ground in such way that they lie on lines parallel to the path of the machine and with their butts forward.

Again the outer or delivery end of the carrier is supported in such way that it is held a short distance from the ground; as illustrated in the drawings, it is from two to four feet therefrom. The bars of the main frame 3 are, approximately, in the horizontal plane of the axis of the bull wheel 4; and, as shown in Fig. 2, the bars 5 and 6 of the carrier frame are in horizontal planes close to the planes of the said frame bars 3; and, therefore, the delivery end of the bundle carrier is, as above remarked, but a short distance from the ground.

Here, again, the present mechanism differs from those used heretofore, each of which had a relatively long carrier extended upward from the rear end of the harvester to an elevated plane sufficiently high to permit the bundles to be delivered to a wagon.

And an important purpose is attained by arranging the delivery end of the present short, light carrier in the low position described. The length of the bundle carrier is approximately (generally somewhat less than) that of the stalks in the bundles; that is, as shown in the drawing, its length is in the neighborhood of from five to seven feet. Each bundle, when its upper end is pushed rearward and laterally by the arm 47 through the guideway between the curved rods 26, 26, falls to a prone position on the carrier, the butts of the stalks being near the inner end of the latter, while the tops fall upon or extend slightly beyond the outer end of the carrier toward the stubble side. The distance of the outer end of the carrier from the longitudinal lines of the bull wheel and of the binder is predetermined to have said end positioned properly with relation to the paths of the draft animals, and of the machine, which will be followed by them, respectively, during the next round across the field. When the carrier is put into action it carries each bundle endwise, with the tops of the stalks extending forward. It continues traveling endwise stubbleward for a distance equal, approximately, to about one-half its length; and at this time one-half thereof projects beyond the end of the carrier. When this projecting half of the bundle (or a little more) passes said end, the weight of the overhanging part causes the tops to drop downward so that their heads contact with the ground, but the butt portions of the bundles, though inclined or nearly vertical, still rest against, or are more or less supported by, the end part of the carrier. The bundles are thus briefly sustained in an inverted position. The carrier, however, travels relatively to its frame, and while the top part of each bundle is rocking over the end of the carrier it is being also bodily moved outward by it, and, at the same time, both the bundle and the conveyer are being advanced bodily with the machine. At the first instant of contact of the bundle top with the ground, the weight is not sufficient for the top part to serve as a pivot. But the force of the moving conveyer continues to push or thrust the bundle further stubbleward. After the top reaches the ground, the ground-contacting part quickly becomes heavier, and then the top of the bundle, for an instant, becomes a pivot while the harvester and the carrier move bodily forward. And during this time the carrier, moving relatively to its frame, is thrusting the butt part of the bundle stubbleward in relation to the pivot-like ground-contacting head part.

The final result is to deposit the bundles on lines which are approximately parallel to the path of the machine, and which are so remote that the bundles do not lie in the paths of the horses when they next cross the field.

If the bundles were ejected from the harvester to fall directly rearward on a carrier which would deliver them on the ground in line with the passageway of the harvester the bundles would be in the way of the machine on the next round, consequently the carrier must be constructed and made to operate in such a manner as to deliver the bundles stubbleward of the path of the harvester. If the carrier is made to operate stubbleward in a line at a right angle to the line of draft, the abrupt change in the direction of travel of the bundles rearward will almost invariably cause them to fall at an angle across the carrier instead of lengthwise thereof, and the result is an imperfect delivery of the bundles on the ground and a frequent clogging of the carrier. To overcome these objectionable features I have mounted the carrier on the harvester in such a manner that it is angularly disposed rearwardly to the transverse vertical plane of the harvester. With the carrier in this position the bundles, aided by the guide rods 26, are deposited lengthwise on the carrier and delivered on the ground with their axes substantially parallel with the line of draft.

Ordinarily in carriers of this class as the bundles are conveyed stubbleward by the carrier the tops first come in contact with the ground and, with the advance of the machine are deposited upon the ground by the action of the conveyors of the carrier, at an angle to the line of draft of the harvester; i have found however that it is desirable that the bundles be removed as far as possible from the machine, and this I accomplish by making the rear side 27 of the carrier of sufficient height so that when the heads of the bundles are on the ground and their contact therewith is aiding the carrier to eject the bundles entirely, the advance of the machine will cause the rear side 27 of the carrier to force the rear ends of the bundles forward as they are moved stubbleward, this action resulting in the bundles being deposited upon the ground practically parallel with the line of draft and entirely removed out of the way of the horses on succeeding trips, the angular position of the carrier relative to the transverse vertical plane of the harvester aiding materially in this action.

If the bundles were ejected from the harvester to fall directly rearward on a carrier which would deliver them on the ground in line with the passageway of the harvester the bundles would be in the way of the machine on the next round, consequently the carrier must be constructed and made to operate in such a manner as to deliver the bundles stubbleward of the path of the harvester. If the carrier is made to operate stubbleward in a line at a right angle to the line of draft, the abrupt change in the direction of travel of the bundles rearward will almost invariably cause them to fall at an angle across the carrier instead of lengthwise thereof, and the result is an imperfect delivery of the bundles on the ground and a frequent clogging of the carrier. To overcome these objectionable features I have mounted the carrier on the harvester in such a manner that it is angularly disposed rearwardly to the transverse vertical plane of the harvester. With the carrier in this position the bundles aided by the guide rods 26, are deposited lengthwise on the carrier and delivered on the ground with their axes substantially parallel with the line of draft.

What I claim is—

1. The combination with a corn harvester and binder, of a bundle carrier mounted thereon at an oblique angle to the line of draft of the harvester, means to guide bundles to fall lengthwise of the carrier as they are received from the harvester, and means for moving the bundles longitudinally of the carrier in substantial parallelism with the longitudinal axis thereof.

2. The combination with a corn harvester and binder, of a bundle carrier mounted thereon, means to guide bundles to fall lengthwise of the carrier as they are received from the harvester, and a conveyor operable at an oblique angle to the line of draft of the harvester to carry and discharge the bundles stubbleward.

3. The combination with a corn harvester and binder, of a bundle carrier mounted thereon at an oblique angle to the line of draft of the harvester, means to guide bundles to fall lengthwise of the carrier as they are received from the harvester, a conveyor operable to carry the bundles laterally end first whereby the tops of the bundles are deposited upon the ground while the butts are still engaged by the conveyor and the forward movement of the machine causes the bundles to fall on the ground in a position substantially parallel with the line of draft.

4. The combination with a corn harvester and binder, of a bundle carrier mounted thereon at an oblique angle to the line of draft, means to guide bundles to fall lengthwise of the carrier as they are received from the harvester, a conveyor operable to carry the bundles laterally and discharge them end first as they leave the carrier, and means on the carrier extending above the plane of the conveyor and operating upon the bundles as the harvester advances to cause said bundles to be deposited upon the ground substantially parallel with the line of draft.

5. The combination with a corn harvester and binder, of a bundle carrier arranged to receive bundles therefrom, and comprising a conveyor operable at an oblique angle to the line of progress of the harvester, and means for delivering the bundles to said conveyor so that they fall thereon substantially lengthwise thereof.

6. The combination with a corn harvester and binder, of a bundle carrier pivotally mounted at its grainward end upon the harvester and extending stubbleward at an oblique angle to the line of draft.

7. The combination with a corn harvester and binder, of a bundle carrier pivotally mounted at its grainward end upon the harvester and extending stubbleward at an oblique angle to the line of draft, and a support secured on the stubbleward side of the harvester and supporting the carrier.

8. The combination with a corn harvester and binder, of a support pivotally connected with the stubbleward side of the harvester and extending beyond the rear thereof, and a bundle carrier mounted on said support rearward of the harvester and having its grainward end pivotally connected to the harvester.

9. The combination with a corn harvester and binder, of a support pivoted intermediate its ends on the stubbleward side of the harvester and extending beyond the rear thereof, and a bundle carrier mounted on said support rearward of the harvester and having its grainward end pivotally connected to the harvester.

10. The combination with a corn harvester and binder, of a support pivoted intermediate its ends on the stubbleward side of the harvester and extending beyond the rear thereof, a bundle carrier mounted on said support rearward of the harvester and having its grainward end pivotally connected to the harvester, and a stop on the stubbleward side of the harvester beneath which the forward portion of said support contacts.

11. The combination with a corn harvester and binder, of a bundle carrier pivotally connected at its grainward end to the harvester and extending stubbleward, a brace connected to the grainward end of the carrier and to the harvester, and a support pivoted intermediate its ends on the stubbleward side of the harvester and extending rearward of the harvester and supporting the bundle carrier.

12. In a corn harvesting and binding mechanism the combination with binding apparatus, of a bundle carrier behind said binding apparatus arranged to receive bundles therefrom, said carrier having means for carrying bundles endwise transversely of the line of progress of the machine and having its delivery end disposed relatively to the ground so as to briefly sustain the bundles in an inverted position after their tops have dropped from the carrier to the ground and to thereafter carry their butts longitudinally of the line of progress of the machine.

13. In a corn harvesting and binding mechanism the combination with a binding apparatus, of a laterally directed carrier arranged to receive bundles therefrom, said carrier having means for carrying the bundles endwise transversely of the line of progress of the machine and having its delivery end disposed relatively to the ground so as to briefly sustain the bundles in an inverted position with their butt portions in engagement with a moving portion of said carrier after the tops have dropped to the ground, whereby said carrier will impart to the butt portions of the bundles both a stubbleward movement and a forward movement.

14. The combination with a corn harvester and binder, of a bundle carrier arranged to receive bundles therefrom, and comprising a conveyor movable transversely relatively to the line of progress of the harvester and adapted to conduct the bundles, with the stalks moving endwise and the tops in advance, to one side of the machine and there discharge them, the discharge end of said carrier being disposed relatively to the ground so that the tops strike the ground while the butts are still engaged by the conveyor, and means for delivering the bundles to the conveyor so that they fall thereon substantially lengthwise thereof with their tops in advance.

15. The combination with a corn harvester and binder, of a bundle carrier arranged to receive bundles therefrom, said bundle carrier being mounted at an oblique angle to the line of progress of the harvester, and comprising a transversely movable conveyor adapted to conduct the bundles, with the stalks moving endwise and the tops in advance, to one side of the machine and there discharge them so that the tops strike the ground while the butts are still engaged by the conveyor, and means for delivering the bundles to the conveyor so that they fall thereon substantially lengthwise thereof with their tops in advance.

In testimony whereof I affix my signature, in presence of two witnesses.

FREDERICK D. WILSON.

Witnesses:
JESSIE SIMSER,
W. G. DUFFIELD.